US012209510B2

(12) United States Patent
Hanschke et al.

(10) Patent No.: US 12,209,510 B2
(45) Date of Patent: Jan. 28, 2025

(54) BLISK

(71) Applicant: MTU Aero Engines AG, Munich (DE)

(72) Inventors: Benjamin Hanschke, Munich (DE); Benjamin Linke, Munich (DE); Axel Stettner, Munich (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 18/408,722

(22) Filed: Jan. 10, 2024

(65) Prior Publication Data

US 2024/0240564 A1 Jul. 18, 2024

(30) Foreign Application Priority Data

Jan. 12, 2023 (DE) ..................... 10 2023 100 651.7

(51) Int. Cl.
*F01D 5/14* (2006.01)
*F01D 5/28* (2006.01)
*F01D 5/34* (2006.01)

(52) U.S. Cl.
CPC ........ *F01D 5/147* (2013.01); *F05D 2240/305* (2013.01); *F05D 2240/306* (2013.01)

(58) Field of Classification Search
CPC .......... F01D 5/147; F01D 5/143; F01D 5/141; F01D 5/34; F01D 9/02; F01D 5/02; F01D 5/14; F05D 2240/80; F05D 2220/32; F05D 2240/24; F05D 2250/71; F05D 2250/711; F05D 2230/00; F05D 2250/70; F05D 2250/713; F05D 2240/306; F05D 2240/305; F05D 2250/712; F05D 2240/301; F05D 2230/50; F04D 29/321
See application file for complete search history.

(56) References Cited

U.S. PATENT DOCUMENTS

| | | | | |
|---|---|---|---|---|
| 6,511,294 | B1 * | 1/2003 | Mielke | F01D 5/06 416/193 A |
| 8,100,655 | B2 | 1/2012 | Stone et al. | |
| 8,206,095 | B2 | 6/2012 | Parker et al. | |
| 9,920,633 | B2 * | 3/2018 | Bergman | F01D 5/143 |
| 10,408,227 | B2 * | 9/2019 | Bailey | F02K 3/06 |

(Continued)

FOREIGN PATENT DOCUMENTS

| | | |
|---|---|---|
| DE | 102013219814 B3 | 11/2014 |
| DE | 102019118549 A1 | 1/2021 |

(Continued)

*Primary Examiner* — Eric J Zamora Alvarez
(74) *Attorney, Agent, or Firm* — Leydig, Voit & Mayer, Ltd.

(57) ABSTRACT

A blisk has at least one blade, with a blade airfoil and a blade root; a platform, the blade being integrally attached to the platform; and a fillet arranged on the blade root and between the blade airfoil and the platform. The fillet merges into the blade at a blade connection. The fillet merges into the platform at a platform connection. The fillet extends with a longitudinal extent around the blade root and a transverse extent from the platform to the blade airfoil. The fillet has a variable radius along the transverse extent. The variable radius has, at least in a first section of the fillet, a minimum radius which, at least in the first section, is spaced apart from the platform by at least 15% of the transverse extent along the transverse extent of the fillet.

16 Claims, 3 Drawing Sheets

(56) References Cited

U.S. PATENT DOCUMENTS

| | | | | |
|---|---|---|---|---|
| 10,844,726 | B2 | 11/2020 | Horn et al. | |
| 11,939,885 | B2 | 3/2024 | Spanrad | |
| 2022/0186622 | A1 * | 6/2022 | Lecuyer | F01D 9/02 |
| 2022/0290634 | A1 * | 9/2022 | Spanrad | F01D 5/34 |
| 2023/0279777 | A1 * | 9/2023 | Hanschke | F01D 5/143 416/239 |

FOREIGN PATENT DOCUMENTS

| | | | |
|---|---|---|---|
| EP | 3473431 | A1 | 4/2019 |
| EP | 4019741 | A1 | 6/2022 |
| EP | 4239163 | A1 | 9/2023 |
| FR | 2905413 | A1 | 3/2008 |
| WO | 2014113043 | A1 | 7/2014 |

* cited by examiner

BLISK

CROSS REFERENCE TO RELATED APPLICATIONS

This application claims benefit to German Patent Application No. DE 10 2023 100 651.7, filed on Jan. 12, 2023, which is hereby incorporated by reference herein.

FIELD

The present disclosure relates to a blisk (also referred to as a bladed disk) for a gas turbine.

BACKGROUND

Rotor blades in turbomachinery are subject to high mechanical loads, which are caused in particular by centrifugal forces, vibrations, and thermal gradients. Local overloading can cause cracks in the material of the blades, which grow into the component under the influence of mechanical and thermal stresses. Particularly in the case of integrally bladed rotors, such as blisks (bladed disks) or blings (bladed rings), the blades and disk and/or ring consist of an integral or monolithic component. It must further be taken into account that foreign particles can enter the engine and cause damage and, in particular, cracks when they hit the blades. Especially due to the combination of these circumstances, cracks can migrate from the blades into the disk or ring body and possibly even cause failure of the entire component. This crack growth is not desirable.

To counteract this failure, so-called double fillets are known from EP 3 473 431 A1, for example, which connect two concave areas with a platform between them so that crack growth takes place away from the rotor disk and into the blade. This fillet shape is not suitable for all applications. For example, boundary conditions due to aerodynamic considerations may prevent the use of such fillets.

Concave fillets with a variable radius are already known from EP 4 019 741 A1. The blade airfoils shown there are part of turbine blades with an outer and an inner shroud, whereby an inner fillet connecting the blade and the inner shroud has a minimum radius in an area close to the platform of a transverse extent of the fillet. Furthermore, the blades have a root area that serves to connect them to a rotor disk. Towards the outside, the radius increases essentially up to a maximum value and then decreases again, with maximum values of the radius being arranged close to the blade airfoil but also at a distance from the blade airfoil. The fillets designed in this way reduce stress on the blade airfoils, but not on the connection between the blade and the platform.

Rotors and/or blisks are arranged on an engine shaft, with which they rotate around an engine axis. Three main axes are therefore defined to describe the geometries occurring in the engines. The first main axis runs in the direction of the engine's axis of rotation and is also referred to as the longitudinal axis, which runs in the axial direction. The first main axis defines a front and a rear of the relevant geometry, with the flow gas entering at the front and exiting at the rear. The second axis runs along a direction perpendicular to the axis of rotation of the engine and is also referred to as the radial axis, which runs in the radial direction. The second main axis determines an outside and an inside of the engine, with the engine axis being in the inside and the radial direction running from the engine axis to the outside. The third main axis runs circumferentially perpendicular to the other two main axes and connects the meridian sections formed by the first two main axes. The three main axes together define three main planes: meridian planes spanned by the longitudinal axis and one radial axis each; circumferential planes lying on a cylinder shell around the axis of rotation; and cross-sectional planes of the engine arranged normally to the engine axis of rotation.

Blades with complex spatial geometry are normally described by blade profiles stacked on top of each other whose profile surface extensions do not necessarily have to lie in just one circumferential plane, but, as curved blade profiles, can also intersect the other main planes. This design is mainly due to the aerodynamic construction of the blades and the specifications for the main flow channel, the edges of which, in particular the inner shroud, do not have to run axially parallel to the main axis. The final shape, particularly in the hub and/or shroud area, deviates additionally for structural-mechanical reasons from this aerodynamically optimized, particularly ideal, blade profile; in most cases, so-called fillets are arranged in this shroud area. The geometric centers of gravity of the aerodynamically optimized blade profiles form a stacking line, whereby the stacking line represents a measure of the pitch of the blade.

Blade profiles are also described by a camber line running from the leading edge to the trailing edge of the blade profile, as well as by the edge lines on the blade surface that run around the blade profile and typically form a teardrop shape with suction and pressure sides.

The camber line is the profile centerline from the leading edge to the trailing edge of the blade and corresponds to a connecting line through all center points of circles inscribed in the blade profile. This connecting line can be described in the simplest approximation by aligned straight lines, but also by splines or other polynomial curves through the center points. If the blade is axially subdivided into a hundred parts or more, for example by means of a hundred axially equidistant inscribed circles and corresponding connection of the circle centers by straight lines, a sufficient accuracy is achieved for the course of the camber line, which can serve as at least an initial reference point for determining the geometric positions of the points involved.

Leading and trailing edges can also be formed by circular sections, since sharp edges are to be avoided in turbomachines and especially in the main gas ducts of these turbomachines. In the following, however, the leading edge and the trailing edge should be reduced to one line, i.e. a series of points on the surface of the blade. The following procedure is used to define a point of this leading edge line and/or trailing edge line on a profile as a leading edge point or trailing edge point. Inscribing circles can be placed up to the leading or trailing edge of the blades. At the leading edge and trailing edge, the camber line runs from the center of the leading edge circle or from the center of the trailing edge circle straight towards the leading edge or trailing edge. As a good approximation, this direction corresponds to the direction of the connecting line of the penultimate circle center point of the respective inscribing circles, because a continuous and converging course of the camber line can be expected in this area if the circle center points are sufficiently close to each other, i.e. if the staggering of the geometry points under consideration is sufficiently fine. This definition is used to determine the leading and trailing edge, especially if the blade geometry is unknown, i.e. data on the blade geometry is not available from the design. A straight line stretching from the leading edge to the trailing edge is referred to as a chord. Unless otherwise specified, data relating to the chord length are to be understood as surface points of the structure lying above or below in and/or against the circumferential direction projected onto the chord length.

It is considered sufficiently approximated to determine the quantitative size values if the position of the points to be determined of the corresponding blade size (axial extent, radial extent, circumferential extent) can be determined accurately to at least one twentieth of the extent of the blade in the corresponding spatial direction. If there are indications that a finer staggering would be necessary or if the geometries under consideration are very close to this description and the values stated in the claims, this approximation should be refined accordingly.

The maximum profile thickness of a profile is the largest possible diameter of a circle between the profile suction side and the profile pressure side, whereby the center of this largest circle is located on the camber line. A connection surface to a rotor hub and/or to a rotor shroud is referred to as a blade root.

Because efforts are made to minimize turbulence and thus losses in engines and to avoid or distribute unwanted stresses in the material of the blades and the platform of the disk, also known as the hub, rotor hub, shroud or inner shroud, so that the unwanted stresses are harmless, the transitions from the blade to the platform in the area of the blade root are made as continuous as possible by providing a fillet. This results in geometries that deviate from the aerodynamically ideal or optimized blade profile, so that the exact position of the leading and trailing edges can possibly no longer be clearly determined by the procedure described above, because the circular shapes of the blade ends at the leading edge and trailing edge are interrupted by the presence of a fillet, i.e. a shape of the blade that deviates from an aerodynamically optimized shape. Another complicating factor is that the blade profiles calculated in the design are not defined along a cylindrical circumferential plane, but can intersect it. Furthermore, the platform and/or hub or endwall contouring of the rotor base body can be adapted to the flow in the area of the blade root, which in turn makes it more difficult to find the start of the fillet.

When determining the sizes of such a blade to be measured, in particular a connecting structure such as a fillet, the surfaces of the blade and the platform as well as the transition, the fillet, between the blade and the platform can be measured optically, for example. However, the exact position of the leading and trailing edges, the exact connecting area from the aerodynamically ideal profile to a fillet and the connecting area from the fillet to the platform of the rotor disk are nevertheless difficult to determine. Internal variables are generally not known and the transitions on the surface from the blade airfoil to the fillet, which is referred to below as the blade connection, and further to the platform of the blisk and/or rotor disk, which is referred to below as the platform connection, are generally continuous due to the aerodynamic shape of the blade. This means that it is also difficult to determine an exact transition point without knowledge of the flow and the design point of the blades.

In order to allow an initially sufficient determination in good approximation of the quantitative size values of blades to be measured without knowledge of the aerodynamic conditions and the design considerations, sections through the blade are used, which lie in one of the main planes, whereby the distances for the approximate determination of the geometries under consideration are staggered along the three main axes by at least one hundredth of the largest longitudinal extent of the blade, the largest radial extent of the blade and the largest circumferential extent of the blade. In other words, a grid (analogous to a grid in a Finite Element Method, abbreviated to FEM) is laid with a fineness of at least twenty steps in each of the three main directions, namely between the foremost and rearmost point of the blade, the points of the blade lying furthest inwards and outwards and between the points of the blade lying furthest apart in the circumferential direction.

The largest circumferential and axial extents of the blade are to be expected at the platform, because this is where the connection area, the fillet, from the blade root to the rotor base body takes place and the blade root has the largest extent.

In order to determine the axial start and the axial end, i.e. the connection points, of the fillet in the axial direction, the contour of the surface in the area of the platform must be considered. If there is a depression in the platform adjacent to the connection area in and/or against the axial direction, the connection point of the fillet to the platform will be an inflection point of the surface. If there is an elevation in the platform in or against the axial direction, the connection point will be a minimum radial distance between the surface and the rotor axis of rotation. If there is an extent with a straight path of the platform in the plane under consideration, the connection point is defined by the start of a curvature.

To determine the start or end of the circumference of the fillet in the circumferential direction, the contour of the surface in the area of the platform must be considered. A transition from the surface of the platform to a connecting structure, for example a fillet, can be expected in an area, in which the curvature of the surface changes. If there is a depression adjacent to the expected area, in which the transition is to be located in or against the circumferential direction, the transition point of the fillet onto the platform will be an inflection point of the surface. If there is an elevation in the platform in and/or against the circumferential direction, the inflection point will be a minimum radial distance between the surface and the rotor axis. If the platform has a straight path in the plane under consideration, the transition point is defined by the start of a curvature.

The axial start and the axial end of the fillet as well as the circumferential start and the circumferential end of the fillet are points that each have a radial distance to the axis of rotation of the turbomachine. A circumferential plane can be defined as a cylindrical shell via the point with the smallest radial distance, which in the following defines an auxiliary shroud of the platform and serves as a connecting point for determining the radial extent of the blade, including the maximum radial extent, as a first approximation.

The largest radial extent of the blade airfoil can then be formed alternatively by forming a further cylinder around the axis of rotation of the engine, the shell surface of which only intersects a single point, namely the outermost point of the blade.

From these maximum extents, the staggerings or grids for determining all the size values of the blade can be derived as indicated above, in particular grids whose edge lengths are each one twentieth or less of the maximum longitudinal, radial and circumferential extent of the blade. The fineness of the grids should depend on the size values under consideration in order to be able to make a comparison with the size values with sufficient certainty.

In order to determine a connection point from the blade airfoil to a connecting structure, for example a fillet, of the airfoil to the platform under unknown flow conditions or without knowledge of the underlying structural-mechanical considerations, the blade airfoil, as described above, is enclosed in a grid subdivision of the meridian planes, the cross-sectional planes and the circumferential planes. Then, for the determination of the connection points of the blade airfoil to the connecting structure, those points of the blade surface in the area, in which the start of the connecting structure is to be expected, are then determined as a first approximation, which have a greater change in curvature compared to at least one radially outer and inner neighboring point viewed along the surface. For the determination of the connection points from the connecting structure to the platform an analogous procedure is used, whereby here both the points on the surface of the platform that are adjacent in the axial direction and in the circumferential direction are used to compare the change in curvature. The same procedure is used to determine the connection points from the connecting structure to the platform, whereby both the points on the surface of the blade or platform that are adjacent in the axial direction and/or in the circumferential direction are used to compare the change in curvature.

Once the connecting areas have been determined, the measured surfaces and the start and end of the connecting structure in the radial direction should now be known. An extension line, which can also be referred to as an extrusion line, of the straight line used to determine the leading edge and/or trailing edge can be generated in the respective circumferential plane of the leading edge and trailing edge. From this extension line, a line can be projected onto the connecting structure up to the blade root in a radial direction, which in the following is used as the leading edge or trailing edge on the connecting structure. In the cases, in which the blades and their connecting structures are intersected in the axial direction due to a geometric limitation of the disk, there may be two leading edges or trailing edges in this area, from which the corresponding other variables for describing the connecting structure are to be determined. Along each of the connecting areas, at least twenty grid points can be placed between each the leading edge and the trailing edge, whereby two opposite points of the two connecting areas arranged on either the suction side or the pressure side are connected along the measured surface, so that a correspondingly fine subdivision of the connecting structure is possible. From this, the extensions of the areas of the connecting structure described in this application, i.e. the fillet, and its variants can be determined at least as a first approximation.

The methods described above for determining the sizes and positions are initial approximation methods for classifying an unknown blade. If necessary, a check should be carried out in a further step, if possible on the basis of the exact geometry and knowledge of the connections. More precise results can be obtained by using actual size values, for example from construction drawings.

SUMMARY

In an embodiment, the present disclosure provides a blisk that has at least one blade, with a blade airfoil and a blade root; a platform, the blade being integrally attached to the platform; and a fillet arranged on the blade root and between the blade airfoil and the platform. The fillet merges into the blade at a blade connection. The fillet merges into the platform at a platform connection. The fillet extends with a longitudinal extent around the blade root and a transverse extent from the platform to the blade airfoil. The fillet has a variable radius along the transverse extent. The variable radius has, at least in a first section of the fillet, a minimum radius which, at least in the first section, is spaced apart from the platform by at least 15% of the transverse extent along the transverse extent of the fillet.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
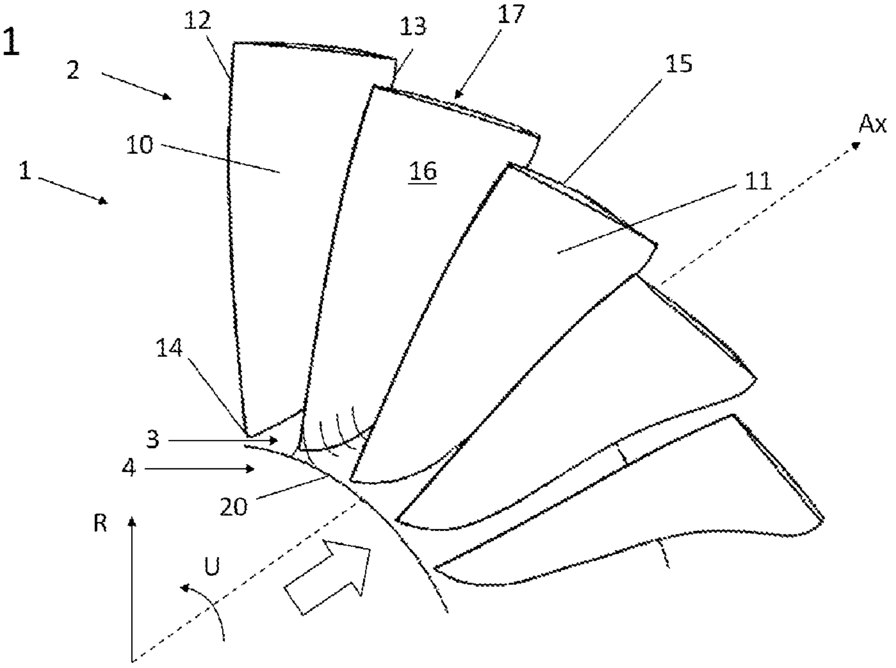
FIG. 1 shows an exemplary embodiment of a compressor blisk according to the invention.

Aspects of the present disclosure provide a blisk whose safety behavior is improved in the event of damage or extreme loads.

An aspect of the present disclosure provides a blisk in a gas turbine, which includes at least one blade with a blade airfoil and a blade root, and a platform, in particular a rotor disk platform. The blade may be integrally attached to the platform. A fillet may be arranged at the blade root and between the blade airfoil and the platform. The fillet may merge into the blade airfoil at a blade connection, and the fillet may merge into the platform at a platform connection. The fillet may extend with a longitudinal extent around the blade root and a transverse extent from the platform connection on the platform to the blade connection on the blade airfoil. The fillet may have a variable radius along the transverse extent. The at least one blade, the platform and the corresponding connection includes the fillet form a blade-platform connection, and also different blade-platform connections can be provided on a blisk.

According to an aspect, the present disclosure provides for the variable radius, at least in a first section of the fillet, that has a minimum radius which, at least in the first section along the transverse extent of the fillet, is spaced from the platform by at least 15%, preferably at least 30%, of the transverse extent. The distance from the platform advantageously prevents the platform and thus the rotor disk from cracking in the event of damage. Such a distance of the minimum radius to the platform thus represents a crack-influencing device. This advantageously introduces a first means of decoupling static and dynamic stresses in the blade into the geometry. This significantly reduces the risk of disk failure. It may be provided that the distance to the platform is at least 35%, in particular at least 40%, especially preferably at least 45% of the transverse extent of the fillet. This can favorably influence crack growth into the blade and away from the rotor disk in the event of damage to the blade. In addition, it may be provided that the minimum radius is not only linear, but also band-shaped. The minimum radius can be constant at least in the first section over a central region of the transverse extent. Accordingly, the variable radius should be viewed as a function that can also have constant values in sections. The structural band of a minimum radius formed in this way can extend along the longitudinal extent of the fillet, whereby the fillet can have a radius with a constant minimum value or a straight line along the transverse extent in the structural band. The first section of the fillet can make up 5% of the longitudinal extent of the fillet. However, it can also be provided that the first section is larger or smaller. For example, the first section may account for 2%, 3% or 4% of the longitudinal extent of the fillet, but the first section may also account for 10%, 15% or 20% of the longitudinal extent of the fillet.

In a preferred embodiment of the present disclosure, the minimum radius along the transverse extent of the fillet to the blade airfoil can be distanced at least 30% of the transverse extent. This can advantageously ensure that even damage that occurs at a low radial height of the blade does not lead to crack growth in the disk, but instead runs in the blade. In this way, a second means of decoupling static and dynamic stresses in the blade can be advantageously introduced into the geometry. It may be provided that the distance to the blade is at least 35%, in particular at least 40%, especially preferably at least 45% of the transverse extent of the fillet. The resulting structure of the fillet radius along the transverse extent is trough-shaped or U-shaped.

In a further preferred configuration of the blisk, the fillet is completely concave along its transverse extent, at least in the first section. The fact that no convex or straight areas are provided means that the component stresses can be favorably distributed and, in addition to the lower aerodynamic effects, lower mechanical stress peaks are advantageously achieved.

In addition, it may be provided that the course of the radii of the fillet along its transverse extent is also completely concave, at least in the first section. This means that the course of the radii has a monotonically increasing first derivative along the transverse extent with a zero crossing at the minimum radius.

In addition, in a further configuration of the blisk, it can be provided that the minimum radius at least in the first section is 5 mm or less, in particular 3 mm or less, especially preferably 2 mm or less. Such small radii allow the material stresses to be specifically influenced, so that crack propagation into the disk can be advantageously reduced or prevented. This is a particularly advantageous third decoupling means that allows static and dynamic stresses to be influenced separately from each other. It may be provided that the minimum radius is at most 5 mm, in particular at most 4 mm. This means that the remaining extent of the radius has larger values, which allows a particularly good distribution of surface stresses.

In a further embodiment of the blisk, the variable radius has a maximum radius on the blade airfoil and/or on the platform, at least in the first section, the variable radius having a monotonically decreasing course between the maximum radius and the minimum radius along the transverse extent of the fillet. As a result, a blade connection with a maximum radius can be formed between the fillet and the blade, and/or a platform connection with a maximum radius can be formed between the fillet and the platform. The fact that the maximum radius is formed at the blade connection and/or at the platform connection means that there are no local stress concentrations along the transverse extent of the fillet that could contribute to component failure.

Furthermore, in a still further embodiment, at least in the first section, a ratio of the minimum radius to the maximum radius on the blade airfoil and/or on the platform can be at least 1.5, in particular at least 5, especially preferably at least 5. Such a radius distribution along the transverse extent in at least one section along the longitudinal extent of the fillet can bring about a targeted increase in stress to influence cracking.

In a complementary or alternative embodiment of the blisk, wherein the blade comprises a blade chord extending from a leading edge to a trailing edge, it may be provided that a ratio of the maximum radius to the minimum radius on the blade airfoil and/or on the platform is maximum at a maximum point of the fillet located between 5% and 95% of a blade chord. The projected distance of the maximum point on the blade chord to the leading edge is at least 5% of the chord length of the blade. This can favorably influence crack growth into the blade and away from the rotor disk in the event of damage to the blade. It may be provided that the distance to the platform is at least 5%, 10%, 15%, 20%, preferably at least 25%, 30%, 35%, in particular at least 40%, or particularly preferably at least 45% of the transverse extent of the fillet. It may be provided that the distance to the blade is at least 5%, 10%, 15%, 20%, preferably at least 25%, 30%, 35%, in particular at least 40%, or particularly preferably at least 45% of the transverse extent of the fillet. It may be provided that the maximum point is arranged in the first section.

In a further embodiment, it may be provided that the fillet has a second section spaced from or adjacent to the first section, wherein at least in the second section a ratio of the maximum radius to a minimum radius on the blade and/or on the platform is at most 1.5, in particular at most 1.2, particularly preferably at most 1.1. In particular, areas can be specifically created in this way that can withstand one of the static or dynamic stresses in particular. This advantageously provides a fourth decoupling means that allows static and dynamic stresses to be specifically influenced separately from one another.

According to a further aspect of the present disclosure, the ratio of the maximum radius ($r_{max}$) to the minimum radius ($r_{min}$) can be larger on the suction side than on the pressure side of the blade airfoil, in particular the ratio on the suction side can be on average twice as large, preferably three times as large, as on the pressure side.

In a preferred further embodiment, the first section extends from a leading edge to a trailing edge of the blade. However, it may also be provided that the first section extends between 30% and 70% of a blade chord of the fillet. Furthermore, other or smaller local sections are also proposed, which have the characteristics of the first section. For example, such a section may be spaced from the leading edge by at least 5%, 10%, 15%, 20%, 25%, 30%, 35%, 40% or 45% of the chord length. Such a section may also, for example, be spaced from the trailing edge by at least 5%, 10%, 15%, 20%, 25%, 30%, 35%, 40% or 45% of the chord length.

In addition, in a further embodiment, it may be additionally provided that the first section is arranged on the pressure side and/or the suction side of the blade. The arrangement of the first section on the suction and/or pressure side can be used specifically to compensate for the static stresses due to a blade inclination. This provides a fifth decoupling means that allows static and dynamic stresses to be influenced separately from each other.

In an advantageous further development, the blisk can be designed in such a way that the first section is arranged on the suction side of the blade and the second section is arranged on the pressure side of the blade. This opposing arrangement of the two different sections of the fillet can have a particularly beneficial effect on stresses that occur due to a pitch of the blade.

A further preferred embodiment of a blisk according to the present disclosure in a gas turbine, which embodiment may be claimed independently, comprises at least one blade with a blade airfoil and a blade root, a platform, in particular a rotor disk platform, wherein the blade is integrally attached to the platform, a fillet arranged at the blade root and between the blade airfoil and the platform, wherein the fillet merges into the blade airfoil at a blade connection and wherein the fillet merges into the platform at a platform connection. The fillet extends with a longitudinal extent around the blade foot and a transverse extent from the platform connection on the platform to the blade connection on the blade airfoil, wherein the fillet has a variable radius along the transverse extent. The at least one blade, the platform and the corresponding connection comprising the fillet form a blade-platform connection, wherein different blade-platform connections can also be provided on a blisk.

According to an aspect of the present disclosure, a composite fillet is provided. Hereby, the radial offset/distance of the blade connection from the platform connection ABdist is greater than the offset of the platform connection relative to the blade connection EBdist when viewed in the circumferential direction. The more precise definition of the boundary curves represents (in addition to the patent already filed for the qualitative radius curves) a further possibility for influencing the control of the static and dynamic load distribution of the component. Thus this element also contributes to an increase in damage tolerance (no crack growth in the disk).

During the structural-mechanical design work, it was shown that so-called “composite blends” have a positive effect on the separation of static and dynamic loads.

In addition to the radii of the fillet contour, the definitions of the rotor-side boundary curve (endwall boundary/platform connection) and the blade-side boundary curve (airfoil boundary/blade connection) are of decisive importance.

According to the present partial aspect of the present disclosure, the limiting curves can be defined parametrically based on the maximum profile thickness (tmax0) of the blisk blade and/or the blade airfoil.

The platform connection/endwall boundary can be created by a rolling ball, a variable rolling ball or an offset of the blade surface around a constant/variable value.

The value range for the area to be protected is EBdist=0.70 . . . 1.35*tmax0

The blade connection/airfoil boundary can hereby be created by a rolling ball, a variable rolling ball or an offset of the annular space surface by a constant/variable value.

The value range for the area to be protected is ABdist=0.8 . . . 2.0*tmax0

In addition, the requirement ABdist>EBdist applies in all areas to guarantee an elliptical shape of the composite blend.

In other words, the radial offset/distance of the blade connection from the platform connection can be in a range ABdist=0.8 . . . 2.0*tmax0 and the offset seen in the circumferential direction of the platform connection relative to the blade connection EBdist can be 0.70 . . . 1.35*tmax0, where ABdist is greater than EBdist.

A further aspect of the present disclosure relates to a blisk in a gas turbine comprising at least one blade having a blade airfoil and a blade root, a platform, in particular a rotor disk platform, the blade being integrally attached to the platform, a fillet connecting the blade to the platform at the blade root and between the blade airfoil and the platform. The fillet extends with a longitudinal extent around the blade root and a transverse extent from the platform to the blade airfoil, the fillet having a variable radius along the transverse extent. An aspect of the present disclosure further provides for this further blade-platform connection such that the fillet has a, in particular structural and/or geometric, decoupling means for static and dynamic stresses occurring in the blade-platform connection during operation.

FIG. 1 shows a perspective view of a segment of an exemplary embodiment of a blisk 2 according to the present disclosure. The blisk 2 is arranged in a gas turbine 1 for an aircraft engine, whereby the gas turbine 1 is indicated in FIG. 1 by its three main axes Ax, R, U. The three main axes run in the axial direction Ax, radial direction R and circumferential direction U. The three main axes run in the axial direction Ax, radial direction R and circumferential direction U. The blisk 2 serves as a rotor in a compressor of the gas turbine 1.

The blisk 2 comprises a blisk disk 4 and a plurality of blades 10, referred to as rotor blades, arranged on the blisk disk 4. The blades 10 are arranged on a platform surface 22 of a platform 20 of the blisk disk 4 at a distance from one another in the circumferential direction U. The blades 10, the platform 20 and a fillet 30 connecting one of the blades 10 and the platform 20 together form a blade-platform connection 3. The blades 10 have a blade airfoil 11 for absorbing aerodynamic forces, a blade root 14 for connection to the platform surface 20 and a blade tip 15 pointing towards an annular space wall of the gas turbine 1. The blisk 2 rotates in the circumferential direction U, whereby a suction side 16 of the respective blade 10 is arranged against the direction of rotation and a pressure side 17 of the respective blade 10 is arranged in the direction of rotation of the blisk 2. The suction and pressure sides 16 and 17 each extend from a leading edge 12 to a trailing edge 13 of the respective blade 10.

The blisks 2 have a particularly robust crack growth behavior, whereby cracks can hardly or not at all penetrate into the disk, but the blades 10 are separated from the platform 20 beforehand.

The blade-platform connections 3 are explained in more detail below with reference to two exemplary embodiments in FIGS. 2*a*, 2*b* and FIGS. 3*a*, 3*b*.

Figure 2A:
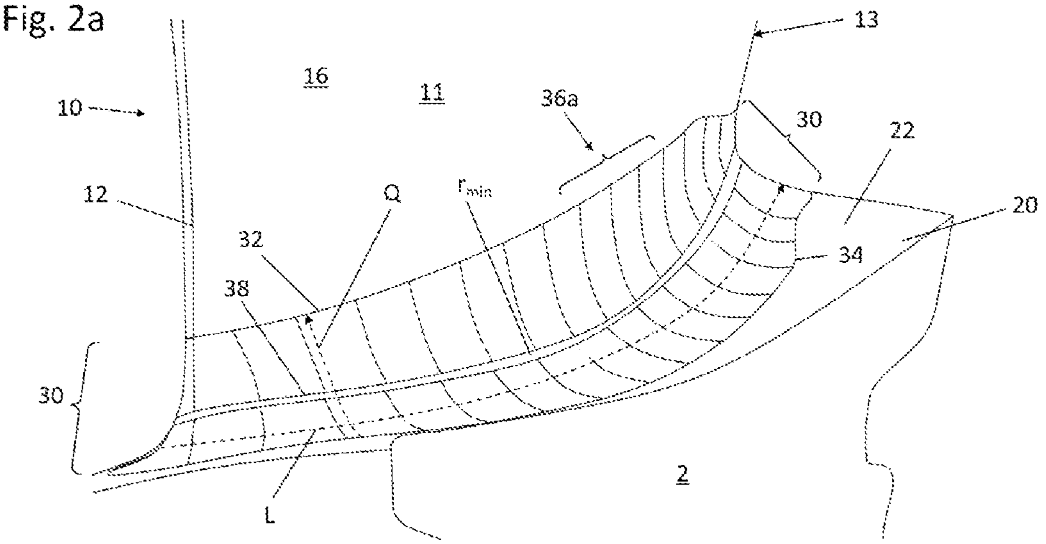
FIG. 2*a* shows a first exemplary embodiment of a blade-platform connection according to the invention on a suction side of a blade.

FIG. 2*a* shows a first exemplary embodiment of a blade-platform connection 3 according to the present disclosure in a spatial, schematic representation on a suction side 16 of a blade 10. The blade-platform connection 3 comprises the blade 10, a platform 20 and a fillet 30 that connects the blade 10 and the platform 20 to one another. As described in FIG. 1, the blade 10 has a blade airfoil 11 and a blade root 14. The fillet 30 surrounds the blade root 14 along its longitudinal extent L and extends transversely to its longitudinal extent L along its transverse extent Q from the platform 20 to the blade airfoil 11.

In the exemplary embodiment, the fillet 30 extends around and from a leading edge 12 to a trailing edge 13 of the blade 10, a longitudinal extent L of the fillet 30 being defined in each case from the leading edge 12 to the trailing edge 13. In this exemplary embodiment, the trailing edge 13 is formed by a cut of the blisk 2, so that the blade 10 has two trailing edges 13 in a region of the blade root 14, which converge at the blade airfoil 11. The fillet 30 therefore ends at the trailing edges 13 and does not encircle them. The fillet 30 adjoins the blade 10 and/or the blade airfoil 11 with a blade connection 32 and adjoins the platform 20 with a platform connection 34. In transverse extent Q, the fillet 30 is concave over the entire longitudinal extent L and has a variable radius r.

The variable radius r is a minimum radius $r_{min}$ in a central region 38 of the fillet 30 along the transverse extent Q. In practical terms, the longitudinal extent L is measured at the height of the minimum radius $R_{min}$ of the fillet. The central region 38 is band-shaped and extends around the blade 10, whereby the minimum radius $r_{min}$ can extend at one point over a part or the entire width of the central region 38. In this way, a surface can be formed that has the minimum radius. The central region 38 is spaced from the blade connection 32 by at least 20%, 25% or 30% of the transverse extent Q of the fillet 30. Furthermore, the central region 38 is spaced from the platform connection 34 by at least 30% of the transverse extent Q of the fillet 30. In the longitudinal extent L of the fillet 30, the minimum radius $r_{min}$ is spaced from the front edge 12 by at least 5%, 10%, 15%, 20%, 25% or 30% of the longitudinal extent L of the fillet 30. Furthermore, the minimum radius $r_{min}$ is at least 10%, 15%, 20%, 25% or 30% of the longitudinal extent L of the fillet 30 from the trailing edge 13.

As a result, the minimum radius $r_{min}$ is advantageously arranged in a central area of the fillet 30 on the suction side 16 of the blade 10. This enables the targeted separation of static and dynamic stress maxima and is therefore beneficial for the damage tolerance of the component.

Figure 2B:
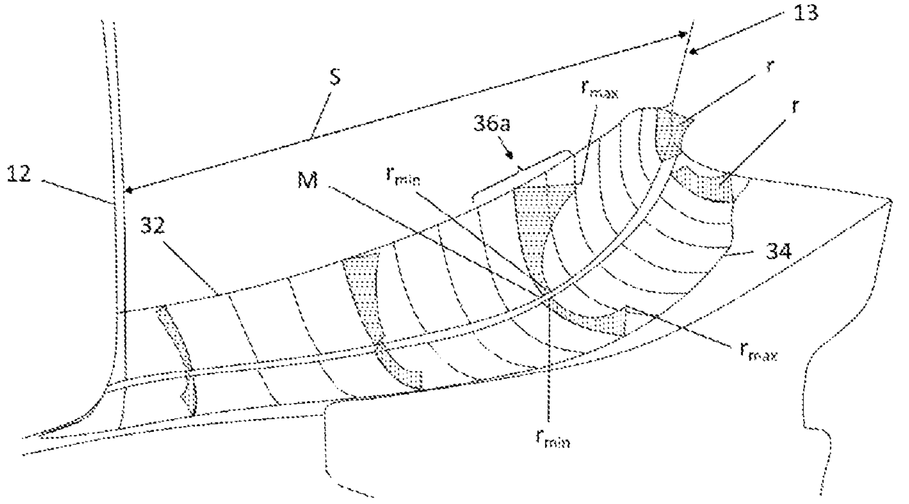
FIG. 2*b* shows the first exemplary embodiment of a blade-platform connection according to the invention illustrated with exemplary radii.

FIG. 2*b* shows the first exemplary embodiment of the blade-platform connection 3 according to the present disclosure illustrated with exemplary radii r. For the sake of clarity, not all reference numerals are shown again.

In the present exemplary embodiment, the variable radii r have a maximum radius $r_{max}$ along the longitudinal extent L in all cases on the outside and inside at the blade transition 32 and at the platform transition 34. In combination with the minimum radius $r_{min}$ in the central region 38, this results in a trough-shaped or U-shaped transverse extent of the fillet 30 along its longitudinal extent L.

Both FIG. 2*a* and FIG. 2*b* show a first section 36*a* of the fillet 30, which can have the above-mentioned properties. In particular, at a maximum point M, a ratio of the larger maximum radius $r_{max}$ to the minimum radius $r_{min}$ can be maximum. The maximum point M may be spaced at least 5%, 10%, 15%, 20%, 25%, 30%, 35%, 40% or 45% from the leading edge 12 and/or the trailing edge 13 projected onto a chord S of the blade 10 at the radial height of the maximum point M. It may be provided that the first section 36*a* is arranged at a position of the fillet 30, which has the smallest distance to an adjacent blade 10 on the blisk 2.

In the first exemplary embodiment in FIGS. 2*a* and 2*b*, the ratio of the maximum radius $r_{max}$ to the minimum radius $r_{max}$ decreases along the longitudinal extent L in the direction of the leading edge 12 and the trailing edge 13. In the present exemplary embodiment, the trough shape or the U-shape is retained between the leading edge 12 and the trailing edge 13 of the blade, but is no longer as pronounced at the leading edge 12 and the trailing edge 13, so that a better flow of force can advantageously take place in the front region and the rear region of the blade 10. In order to achieve this progression, at least one of the two maximum radii $r_{max}$ can, for example, decrease in the direction of the leading edge and/or the trailing edge, and in particular decrease monotonically. Alternatively or additionally, it is also possible for the minimum radius $r_{min}$ to increase in the direction of the leading edge 12 and/or the trailing edge 13.

The exemplary embodiment shown avoids further stress concentrations in areas subject to high static loads, for example in the fillet between the blade and platform, by introducing a larger radius.

Figure 3A:
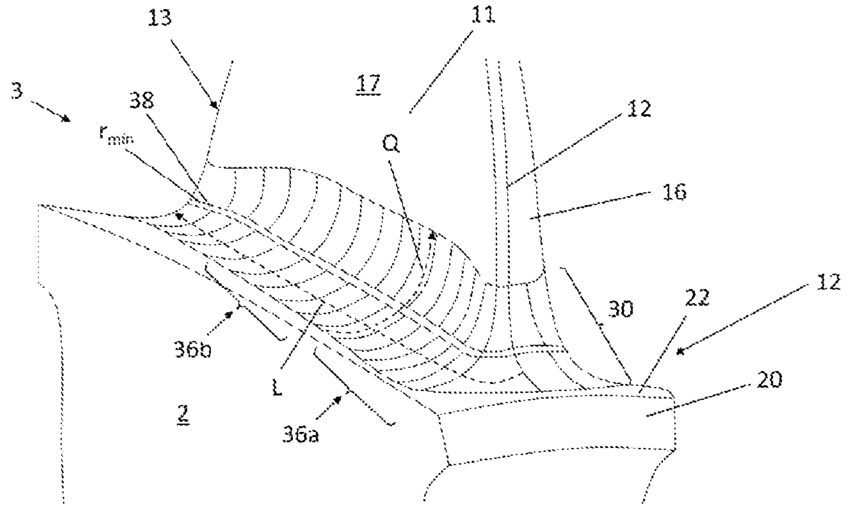
FIG. 3*a* shows a second exemplary embodiment of a blade-platform connection according to the invention on a pressure side of a blade.
Figure 3B:
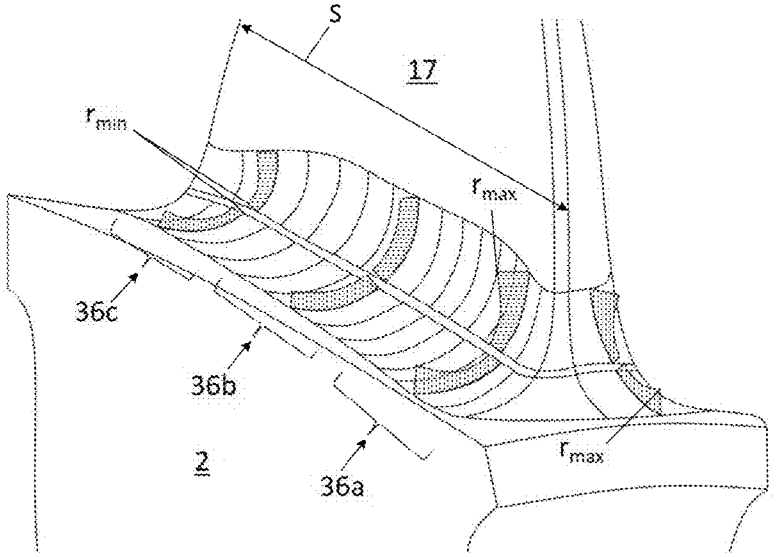
FIG. 3*b* shows the second exemplary embodiment of a blade-platform connection according to the invention illustrated with exemplary radii.

FIGS. 3*a* and 3*b* show a second exemplary embodiment of a blade-platform connection 3 according to the present disclosure in a spatial, schematic representation on a suction side 16 of a blade 10. Only differences to the first exemplary embodiment are described below. Further details and differences to the first exemplary embodiment may arise from the figures.

On the pressure side 17 of the blade 10, a first section 36*a* having the characteristics described above with respect to the first exemplary embodiment is arranged in a front region of the blade-platform connection 3 in spatial proximity to the leading edge 12 of the blade 10. The distance to the leading edge 12 along the longitudinal extent of the fillet is 20% or less. This means that a maximum ratio between the maximum radius $r_{max}$ and the minimum radius $r_{min}$ is arranged in the vicinity of the leading edge 12.

A second section 36*b* of the fillet 30 with properties differing from the first section 36*a* is arranged in a central region along the longitudinal extent L of the fillet 30. This second section 36*b* is arranged on the pressure side and has a ratio of the maximum radius $r_{max}$ to the minimum radius $r_{min}$ of less than 1.5. Particularly preferably, the radius along the transverse extent Q of the fillet 30 is constant in the second section 36*b*. The second section 36*b* can preferably be spaced apart from the leading edge 12 and/or the trailing edge 13 by at least 30% of the length of the blade chord, projected onto the blade chord S. This advantageously achieves a uniform radius in the center of the blade in the longitudinal extent L of the fillet 30.

It may be provided that a third section 36*c* of the fillet is provided in a rear region of the fillet 30 in the vicinity of the trailing edge 13 of the blade 10, which is similar to the first section but has a smaller ratio of maximum radius $r_{max}$ to minimum radius $r_{min}$.

Finally, in a further embodiment example, it may be provided that a fillet 30 according to the first exemplary embodiment as shown in FIGS. 2*a* and 2*b*, which describes the fillet path on the suction side 16 of the blade 10, and that a fillet 30 according to the second exemplary embodiment as shown in FIGS. 3*a* and 3*b*, which describes the fillet path on the pressure side 17, are combined. Thus, the first section can be arranged at the same height or at a maximum 10% deviation along the chord S of the blade 10 as the second section 36*b*. This directs crack propagation to one side of the blade, so that the probability of a disk crack is advantageously reduced on the more heavily loaded pressure side 17 of the blade 10.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 gas turbine
2 blisk
3 blade-platform connection
10 blade
11 blade airfoil
12 leading edge
13 trailing edge
14 blade root
15 blade tip
16 suction side
17 pressure side
20 platform
22 platform surface
30 fillet
32 blade connection
34 platform connection
**36*a*** first section
**36*b*** second section
38 central region
R variable radius
$r_{min}$ minimum radius
$r_{max}$ maximum radius
S chord blade
M maximum point

The invention claimed is:

1. A blisk, the blisk comprising:
at least one blade comprising a blade airfoil and a blade root;
a platform, the blade being integrally attached to the platform; and
a fillet arranged on the blade root and between the blade airfoil and the platform,
wherein the fillet merges into the blade at a blade connection,
wherein the fillet merges into the platform at a platform connection,
wherein the fillet extends with a longitudinal extent around the blade root and a transverse extent from the platform to the blade airfoil,
wherein the fillet has a variable radius along the transverse extent, and
wherein the variable radius has, at least in a first section of the fillet, a minimum radius which, at least in the first section, is spaced apart from the platform by at least 30% of the transverse extent along the transverse extent of the fillet.

2. The blisk according to claim 1, wherein the minimum radius along the transverse extent of the fillet is spaced from the blade by at least 30% of the transverse extent.

3. The blisk according to claim 1, wherein the fillet is completely concave along its transverse extent at least in the first section.

4. The blisk according to claim 1, wherein the minimum radius at least in the first section is 5 mm or less.

5. The blisk according to claim 1, wherein the variable radius has, at least in the first section, a maximum radius on the blade airfoil or on the platform, and wherein the variable radius has a monotonically decreasing progression between the maximum radius and the minimum radius.

6. The blisk according to claim 1, wherein, at least in the first section, a ratio of a maximum radius to the minimum radius on the blade airfoil or on the platform is at least 1.5.

7. The blisk according to claim 5, wherein the blade further comprises a blade chord extending from a leading edge to a trailing edge, wherein a ratio of the maximum radius at the blade airfoil or at the platform to the minimum radius is maximum at a maximum point of the fillet, which is located between 30% and 70% of a blade chord.

8. The blisk according to claim 5, wherein the fillet has a second section spaced from the first section along the longitudinal extent or adjacent to the first section along the longitudinal extent, and wherein at least in the second section a ratio of a maximum radius to the minimum radius on the blade airfoil or on the platform is at most 1.5.

9. The blisk according to claim 1, wherein the first section extends from a leading edge to a trailing edge of the blade.

10. The blisk according to claim 1, wherein the first section is arranged on a pressure side or a suction side of the blade.

11. The blisk according to claim 9, wherein the first section is arranged on the suction side of the blade and the second section is arranged on the pressure side of the blade.

12. The blisk according to claim 1, wherein the blisk is a compressor blisk for a gas turbine.

13. The blisk according to claim 1, wherein the variable radius has, at least in the first section of the fillet, a maximum radius at each end of the transverse extent.

14. The blisk according to claim 13, wherein the fillet is concave about the minimum radius over the entire longitudinal extent.

15. The blisk according to claim 14, wherein, in the longitudinal extent of the fillet, the minimum radius is spaced from a leading edge of the blade by at least 5% of the longitudinal extent of the fillet.

16. The blisk according to claim 14, wherein, in the longitudinal extent of the filet, the minimum radius is spaced from a trailing edge of the blade by at least 10% of the longitudinal extent of the fillet.

* * * * *